US010666455B2

(12) United States Patent
Saes et al.

(10) Patent No.: US 10,666,455 B2
(45) Date of Patent: *May 26, 2020

(54) TIME DIVISION MULTIPLEXING OF RF TRANSCEIVERS CONTROLLED BY AN AUXILIARY CHANNEL, FOR EXAMPLE, FOR A LIGHTING DEVICE

(71) Applicant: ABL IP HOLDING LLC, Conyers, GA (US)

(72) Inventors: Marc Saes, Eindhoven (NL); Sajin George, Somerville, MA (US); Yenpao Lu, Cumming, GA (US)

(73) Assignee: ABL IP HOLDING LLC, Conyers, GA (US)

(*) Notice: Subject to any disclaimer, the term of this patent is extended or adjusted under 35 U.S.C. 154(b) by 31 days.

This patent is subject to a terminal disclaimer.

(21) Appl. No.: 16/262,317

(22) Filed: Jan. 30, 2019

(65) Prior Publication Data

US 2019/0349217 A1      Nov. 14, 2019

Related U.S. Application Data

(63) Continuation of application No. 15/977,408, filed on May 11, 2018, now Pat. No. 10,270,618.

(51) Int. Cl.
*H05B 37/02*      (2006.01)
*H04L 12/40*      (2006.01)
(Continued)

(52) U.S. Cl.
CPC ....... *H04L 12/40013* (2013.01); *H05B 45/00* (2020.01); *H05B 47/18* (2020.01); *H05B 47/19* (2020.01); *H04W 52/0209* (2013.01)

(58) Field of Classification Search
CPC ............ H05B 37/0218; H05B 37/0227; H05B 37/0254; H05B 37/0272
(Continued)

(56) References Cited

U.S. PATENT DOCUMENTS 7,812,543 B2   10/2010  Budike, Jr.
8,604,701 B2 * 12/2013  Verfuerth ........... H05B 37/0227
                                                    315/149
(Continued)

OTHER PUBLICATIONS

Wikipedia, "Manchester Code," last edited Jan. 20, 2018, retrieved Apr. 16, 2018 from https://en.wikipedia.org/w/index-php?title=Manchester_code&oldid=821449853, 4 pages.
(Continued)

*Primary Examiner* — Tung X Le
(74) *Attorney, Agent, or Firm* — RatnerPrestia

(57) ABSTRACT

Devices in a wireless network, such as wirelessly networked lighting devices, utilize two different types of radios, e.g. implementing two or more protocols such as Bluetooth and WiFi. Such radios operate in overlapping frequency bands of the RF spectrum. Time Division Multiplexing (TDM) of the two types of radio operations mitigates interference between the protocols competing in the spectrum overlap. In the examples with lighting devices, a driver of the light source provides a data bus that may be used as an auxiliary communications channel to implement TDM access by the radios to the overlapping frequency bands.

18 Claims, 5 Drawing Sheets

(51) Int. Cl.
*H05B 45/00* (2020.01)
*H05B 47/18* (2020.01)
*H05B 47/19* (2020.01)
*H04W 52/02* (2009.01)

(58) Field of Classification Search
USPC .................................... 315/152, 307, 312
See application file for complete search history.

(56) References Cited

U.S. PATENT DOCUMENTS

| | | |
|---|---|---|
| 9,559,773 B1 | 1/2017 | Maa et al. |
| 9,883,570 B1 | 1/2018 | Turvy, Jr. et al. |
| 2011/0101869 A1* | 5/2011 | Pope ...................... G08C 17/02 |
| | | 315/132 |
| 2012/0040606 A1 | 2/2012 | Verfuerth |
| 2015/0002305 A1* | 1/2015 | Wells ................. H05B 37/0272 |
| | | 340/815.4 |
| 2017/0094754 A1 | 3/2017 | Hartman et al. |
| 2017/0245351 A1* | 8/2017 | Leinen ............... H05B 37/0272 |

OTHER PUBLICATIONS

A White Paper from Laird Technologies entitled "Bluetooth and Wi-Fi Coexistence," Nov. 2011, 6 pages.
Entire patent prosecution history of U.S. Appl. No. 15/977,408, filed May 11, 2018, entitled "Time Division Multiplexing of RF Transceivers Controlled by an Auxiliary Channel, For Example, For a Lighting Device."

* cited by examiner

TIME DIVISION MULTIPLEXING OF RF TRANSCEIVERS CONTROLLED BY AN AUXILIARY CHANNEL, FOR EXAMPLE, FOR A LIGHTING DEVICE

RELATED APPLICATION

This application is a continuation of and claims priority from U.S. patent application Ser. No. 15/977,408, filed May 11, 2018, entitled "Time Division Multiplexing of RF Transceivers Controlled by an Auxiliary Channel, For Example, for a Lighting Device," the complete contents of the disclosure of which are entirely incorporated herein by reference.

TECHNICAL FIELD

The present subject matter relates to techniques and equipment to improve coexistence of multiple potentially interfering radio-frequency technologies, for example, in a light fixture that may be configured as node of a wireless network in a lighting system.

BACKGROUND

In a wireless network having radio-frequency (RF) nodes, each node typically includes a receiver and transmitter, sometimes referred to collectively as a transceiver, offering capabilities for receiving and sending digital information over radio signals. Sometimes more than one method of RF communication is supported. In an example, an RF node of such a network has both a Bluetooth radio and a WiFi radio, although these two radio types are discussed here only by way of a non-limiting example.

Depending on the particular radios used in nodes equipped with multiple transceivers, RF technologies that use different signaling methods communicate via overlapping frequency bands; and the communications in the overlapping bands interfere with each other. For example, Bluetooth signals use frequencies between 2.4000 GHz and 2.4836 GHz (the "2.4 GHz band"), while WiFi signals are broadcast using frequencies in three 22-MHz-wide sub-bands spaced out within the 2.4 GHz band. The two methods thus overlap, and concurrent Bluetooth and WiFi communications may interfere with one another.

Both Bluetooth and WiFi provide for non-interference among multiple signals of the same type. For example, multiple Bluetooth signals can coexist in the same space without confusion, and multiple WiFi signals can coexist in the same space without confusion. Each radio technology utilizes a particular coding technique, e.g. a specific form of spread spectrum unique to the particular technology, to allow receivers to disentangle received signals. However, each signal type interferes with the other. In the example, Bluetooth signals act as noise for WiFi receivers and vice versa.

If a single nodal device has multiple RF transceiver types, two or more of the RF transceivers may interfere with each other in the manner just described, causing errors (e.g., packet losses with resulting re-transmissions) or even failure. In an example, each node of a network has both a Bluetooth radio and a WiFi radio, each of which interferes with the other. In another example, some nodes in an RF network comprise Bluetooth radios while others comprise WiFi radios; or various nodes may have one or the other radio while some number of other nodes may have a combination of the two RF types, (e.g. some nodes have Bluetooth only, some have WiFi only, and other nodes have both). The ability of two or more RF types with overlapping spectra to operate in a space is termed "RF coexistence" (or simply "coexistence") of the types. It is desirable to enable coexistence of two or more RF types with little or no interference there between.

Traditional luminaires can be turned ON and OFF, and in some cases may be dimmed, usually in response to user activation of a relatively simple input device connected into the lines supplying power to some number of luminaires. More sophisticated lighting control systems automate the operation of the luminaires throughout a building or residence based upon preset time schedules, occupancy, and/or daylight sensing. Such lighting control systems receive sensor signals at a central lighting control panel, which responds to the received signals by deciding which, if any, relays, switching devices, and/or dimming ballasts to drive in order to turn on or off and/or adjust the light levels of one or more luminaires. Such advanced controls have involved networked communications to/from the luminaires. More recent lighting systems utilizes wireless communications; and some such advanced systems utilize multiple radio transceivers in at least some nodes of the wireless network. Such a light system therefore may be subject to issues of coexistence of the radio technologies, as generally outlined above.

A variety of techniques have been proposed for providing coexistence among radio technologies operating in a single device and/or within the same space. A first such approach involved spatial isolation. Continuing with the Bluetooth plus WiFi example, if all Bluetooth devices are kept sufficiently far from all WiFi devices and/or sufficiently isolated therefrom by barriers to radio waves, there will be no significant interference between the two RF types.

Another approach used adaptive frequency hopping. In this method in the example, the Bluetooth devices measure noise in sub-bands of the 2.4 GHz band and then restrict their transmissions to sufficiently quiet portions of the 2.4 GHz band, sidestepping the interference. Where WiFi is the interference, Bluetooth will restrict its transmissions to sub-bands within the parts of the 2.4 GHz band that are not used by WiFi. Disadvantageously, this method requires more complex Bluetooth circuitry and may restrict Bluetooth signaling to a relatively small fraction of the original designated bandwidth time slot.

A further approach used Frequency isolation. Continuing the example, the WiFi transmission can be performed in a different band (i.e., 5 GHz rather than 2.4 GHz). This is more costly and less common than 2.4 GHz WiFi, and the two types of WiFi are not compatible with each other without extra gear.

A fourth approach involved time division multiplexing (TDM), which may be used to provide mutually exclusive (in the time domain) access to the overlapping frequency bands of the two radio technologies. Such access control utilizing separation or isolation in the time domain is referred to as Time-division multiple access (TDMA). In TDM coexistence, Bluetooth and WiFi take turns. TDMA is a channel access method often utilized for shared-medium networks. It allows several users to share the same frequency channel, even the exact same frequency channel by dividing each signal into different time slots. The users transmit in rapid succession, one after the other, each using its own time slot.

In a first TDM method, the "two-wire" method, two wires connect the RF transceivers. Continuing with the Bluetooth plus WiFi example, the Bluetooth device places a high voltage on the first wire when it is using the 2.4 GHz band (sending or receiving), and the WiFi device refrains from operating while this line is high. This gives the Bluetooth radio exclusive access to the Bluetooth frequency band, including the overlap with the WiFi frequency band, for some period of time. The second wire similarly silences the Bluetooth device when the WiFi radio is operating. This gives the WiFi radio exclusive access to the WiFi frequency band, including the overlap with the Bluetooth frequency band, for some period of time. The radios claim use some or all of the 2.4 GHz band on a first-come, first-served basis. In a second TDM method, the "three-wire" method, three wires connect the RF transceivers. Two of the wires operate as described above for the two-wire method. The third wire enables the Bluetooth device to override the WiFi device, claiming priority.

There is room for further improvement with techniques enabling RF coexistence. There also is room for further improvement in such coexistence techniques as may be implemented in an RF nodal network of a lighting system.

SUMMARY

The concepts disclosed herein provide improved coexistence between radio transceivers of different technology types by utilizing a data bus provided by a driver of a lighting device to implement time division multiplexing of the communications via the overlapping frequency bands used by the different wireless radio technology types.

An example lighting device, such as a light fixture or the like, includes a light source and two wireless transceivers. A first of the wireless transceiver is of a first type configured to communicate over a first radio frequency band; and the second of the wireless transceivers is of a second type different from the first type, and configured to communicate over a second radio frequency band. The second radio frequency band at least partially overlaps the first frequency band. The lighting device also includes a driver configured to supply power to and control operation of the light source, and the driver provides a data bus coupled to support an exchange of data to and from the wireless transceivers. The wireless transceivers are configured to implement time division multiple access radio communications over the respective first and second frequency bands, in response to at least some data received by either one or both of the wireless transceivers over the data bus provided by the driver.

Another disclosed example relates to a system that includes wireless enabled light fixtures distributed about a space. Each of the wireless enabled light fixtures includes a light source, a light source driver having a power supply to drive the light source and a data bus interface. Each wireless enabled light fixture further includes a data bus provided by the interface of the driver, and a first wireless transceiver coupled to that data bus. The first transceiver is of a first type configured to communicate over a first radio frequency band.

In the system example, each of two respective wireless enabled light fixtures further includes a second wireless transceiver coupled to the data bus provided by the interface of the driver of the respective light fixture. The second wireless transceiver is of a second type different from the first type. Each second wireless transceiver is configured to communicate over a second radio frequency band that at least partially overlaps the first frequency band. In each of the respective wireless enabled light fixtures, the wireless transceivers are configured to implement time division multiple access radio communications over the respective first and second frequency bands, in response to at least some data received by either one or both of the wireless transceivers over the data bus provided by the interface in the driver of the respective light fixture.

Additional objects, advantages and novel features of the examples will be set forth in part in the description which follows, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

BRIEF DESCRIPTION OF THE DRAWINGS

The drawing figures depict one or more implementations, by way of example only, not by way of limitations. In the figures, like reference numerals refer to the same or similar elements.

DETAILED DESCRIPTION

Figure 1:
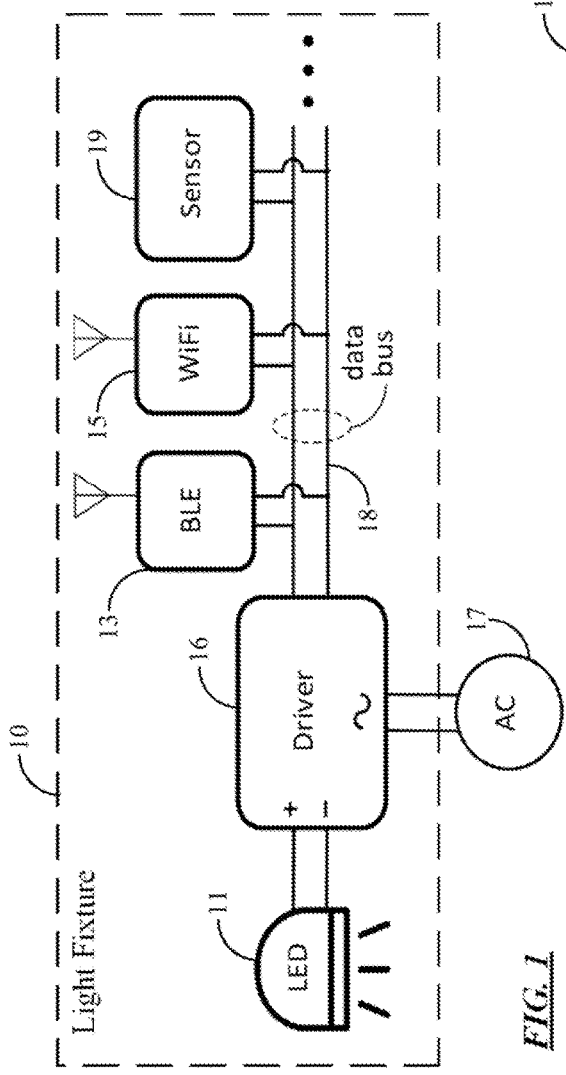
FIG. 1 is a simplified, functional block diagram of an example of a light fixture or other type lighting device, with multiple wireless transceivers and a data bus.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

Herein, two or more RF devices are said to be "in the same space" if each device receives significant interference from at least one of the other devices. A Bluetooth device and a WiFi device, for example, that are far enough apart to not interfere are not "in the same space" in this sense, even if they are in the same room.

The ability of transceivers of two or more RF types with overlapping spectra to operate in the same space is termed "RF coexistence" (or simply "coexistence") of the types: e.g., "Bluetooth and WiFi coexistence." Bluetooth and WiFi coexistence is the dominant practical case discussed below and shown in the drawings by way of an example, but herein "coexistence" signifies coexistence of any two or more RF transceiver types. That is, there is no restriction to Bluetooth, WiFi, Zigbee, or the like or to coexistence of only two RF transceiver types. Also included is coexistence of multiple RF devices that are of the same protocol but that are not enabled by spread-spectrum signaling or other means to operate simultaneously in a given band. It is desirable to enable coexistence of two or more RF types, for example, where the radios are co-located within a single nodal device (e.g., a lighting device) and/or possibly even where the different types radios are within separate devices that are in the same space (e.g., multiple luminaires or other units coupled over the data bus provided by one driver).

The existing TDM coexistence techniques outlined above typically utilized dedicated wires, and the "wires" were in practice conducting paths on a printed circuit board or within a combination Bluetooth+WiFi chip. The two-wire and three-wire methods thus are used only for co-located pairs of RF devices. Also, each wire conveys binary states of a single setting only (i.e., the wire state is held high or the wire state is held low), so that the wires do not constitute a general-purpose data channel.

The various examples disclosed herein relate to a device and/or a network of wireless devices, such as wirelessly networked lighting devices, that implement a TDMA coexistence scheme controlled via a data bus that provides an auxiliary data channel to control implementation of the TDMA. In the detailed examples, a nodal wireless device has transceivers that utilize two different types of radio technologies, e.g. implementing two or more protocols such as Bluetooth and WiFi. The different types of radio transceivers operate in overlapping frequency bands of the RF spectrum. Then time-divided operations of the two types of radio transceivers mitigates interference between the protocols competing in the spectrum overlap. In the examples with lighting devices, a driver of the light source provides the data bus that may be used as the auxiliary data communications channel to implement the TDM access to the overlapping frequency bands by the different type radio transceivers.

The examples enable RF coexistence via TDMA of any number of RF devices of any two or more types, via the auxiliary channel, at least substantially preventing interference among the radio protocols. The data bus may be extended spatially, e.g. between circuits on a chip, chips on a board, circuit boards in a box, or separate boxes in a space. Much greater flexibility is enabled.

The description below encompasses a variety of techniques to control the radio TDMA via the auxiliary channel of the data bus provided by the light source driver. In one approach, the driver is relatively passive. The driver provides the data bus and may control the exchange of data via the bus (e.g. by a polling protocol or the like), but the logic of the driver does not necessarily dictate the access timing by the different radio transceivers. With this approach, each radio transceiver provides data on the bus to effectively signal usage of the respective radio frequency band. The signaling may relate to transmission or reception over the respective frequency band. Any other transceiver detects such signaling on the data bus and refrains from transmission over its respective frequency band. The other type transceiver refrains at least while the signaling transceiver is transmitting and may refrain while the signaling transceiver is receiving over its respective frequency band.

In an alternate approach, the logic of the driver (e.g. a processor and instructions that configure the processor) enables the driver to communicate over the data bus to control access by the transceivers on the bus to use the respective frequency bands and thus implement the TDMA scheme. In this approach, at a first time, the driver is configured to communicate over the data bus to grant access for the first type wireless transceiver to transmit over the first radio frequency band and to cause the second type wireless transceiver to refrain from transmitting over the second radio frequency band during transmission over the first radio frequency band by the first type wireless transceiver. At another time, the driver communicates over the data bus to grant access for the second type wireless transceiver to transmit over the second radio frequency band and to cause the first type wireless transceiver to refrain from transmitting over the first radio frequency band during transmission over the second radio frequency band by the second type wireless transceiver.

These TDMA coexistence techniques using the driver-provided data bus may be implemented in a system of lighting devices (e.g. light fixtures or the like), where at least some of the devices have two or more different types of radio transceivers. A specific example discussed in more detail later has a number of such multi-transceiver lighting devices each configured to act as an edge gateway and to support communication via one of the radio technologies to a higher level gateway referred to as a fog gateway. Other nodal devices, not currently configured as gateways may have a single type radio frequency transceiver or may have multiple transceivers, e.g. for future configuration as a gateway.

The term "lighting device" as used herein is intended to encompass essentially any type of device that processes, generates, or supplies light, for example, for general illumination of a space intended for use of or occupancy or observation, typically by a living organism that can take advantage of or be affected in some desired manner by the light emitted from the device. However, a lighting device may provide light for use by automated equipment, such as sensors/monitors, robots, etc. that may occupy or observe the illuminated space, instead of or in addition to light provided for an organism. It is also possible that one or more lighting devices in or on a particular premises have other lighting purposes, such as signage for an entrance or to indicate an exit. Of course, the lighting devices may be configured for still other purposes, e.g. to benefit human or non-human organisms or to repel or even impair certain organisms or individuals. In most examples, the lighting device(s) illuminate a space or area of a premises to a level useful for a human in or passing through the space, e.g. regular illumination of a room or corridor in a building or of an outdoor space such as a street, sidewalk, parking lot or performance venue. The actual source of light in or supplying the light for a lighting device may be any type of light emitting, collecting or directing arrangement. Where the source is driven by electrical power, the light source typically will be in a lamp, light fixture or other luminaire. Other elements of the device, such as the processor and transceivers of an intelligent lighting device, may be part of the luminaire that contains the light source or may be implemented somewhat separately and coupled to operate the light source in the luminaire.

Terms such as "artificial lighting," as used herein, are intended to encompass essentially any type of lighting that a device produces light by processing of electrical power to generate the light. An artificial lighting device, for example, may take the form of a lamp, light fixture, or other luminaire that incorporates a light source, where the light source by itself contains no intelligence or communication capability, such as one or more LEDs or the like, or a lamp (e.g. "regular light bulbs") of any suitable type. The illumination light output of an artificial illumination type luminaire, for example, may have an intensity and/or other characteristic(s) that satisfy an industry acceptable performance standard for a general lighting application.

The term "coupled" as used herein refers to any logical, optical, physical or electrical connection, link or the like by which signals or light produced or supplied by one system element are imparted to another coupled element. Unless described otherwise, coupled elements or devices are not necessarily directly connected to one another and may be separated by intermediate components, elements or communication media that may modify, manipulate or carry the light or signals.

Light output from the lighting device may carry information, such as a code (e.g. to identify the luminaire or its location) or downstream transmission of communication signaling and/or user data. The light based data transmission may involve modulation or otherwise adjusting parameters (e.g. intensity, color characteristic or distribution) of the illumination light output from the lighting device.

Reference now is made in detail to the examples illustrated in the accompanying drawings and discussed below. FIG. 1 illustrates a lighting device 10, such as a light fixture or the like, that includes a light source and two wireless transceivers.

The emitter or emitters forming the light source may be any suitable type light emitting device, such as various forms of incandescent, fluorescent, halide, halogen, arc, or neon lamps. In many examples of a fixture like 10, the emitters are solid state light emitters, just a few examples of which includes electro luminescent (EL) devices, various types of light emitting diodes (LEDs), organic light emitting diodes (OLEDs), planar light emitting diodes (PLEDs) and laser diodes. For purposes of further discussion, the light fixture 10 includes a source formed by one or more lighting emitting diodes indicated collectively by the element labeled LED 11 in the diagram.

Although some light fixtures discussed in a system example later may have a single radio frequency (RF) type wireless transceiver, the example light fixture 10 includes two RF wireless transceivers 13 and 15. In the example, the first wireless transceiver 13 is of a first type, e.g. a Bluetooth Low Energy (BLE) transceiver, configured to communicate over a first radio frequency band. The second wireless transceiver 15 is of a second type, e.g. a WiFi transceiver, different from the first type (BLE); and the second wireless transceiver 15 is configured to communicate over a second radio frequency band. The second radio frequency band (for WiFi in the example) at least partially overlaps the first frequency band (for BLE in the example). For example, BLE or other Bluetooth signals use frequencies between 2.4000 GHz and 2.4836 GHz (the "2.4 GHz band"), while WiFi signals are broadcast using frequencies in three 22-MHz-wide sub-bands spaced out within the 2.4 GHz band. BLE and WiFi are used here by way of non-limiting examples only. Other examples of suitable transceivers include 3G, 4G or 5G cellular transceivers, Zigbee transceivers, sub-gigahertz (e.g. 900 MHz) personal area network (PAN) transceivers, or the like. Also, the example shows two RF wireless transceivers, although the present concepts are similarly applicable in lighting devices that include one or more additional RF wireless transceivers of the same or additionally different types. The time division techniques for coexistence, however, apply to various combinations of two or more transceivers of different types where the operational frequency bands at least somewhat overlap.

The light fixture 10 also includes a driver 16 configured to supply power to and control operation of the light source, in this example, the LEDs 11. As discussed more later, the example driver 16 draws power from an external source, such as alternating current (AC) mains 17 and provides direct current (DC) to power the LEDs 11. The example driver 16 is an intelligent type device in that it is programmable and interfaces with additional components in the light fixture 10. One aspect of such a driver 16 is that the driver 16 provides a data bus 18 coupled to support an exchange of data with and for other components of the fixture 10. In the light fixture 10, the data bus 18 supports exchange of data to and from the wireless transceivers 13 and 15. The data exchange over the data bus 18 may be between the the wireless transceivers 13 and 15 or between the driver 16 and either one of the wireless transceivers 13 and 15.

Depending on the driver and bus design, the fixture components coupled on the data bus 18 use a suitable protocol to exchange data, commands, etc. For example, the driver 16 may poll the other components on the data bus 18, and the other components will respond by sending any data ready for communication over the bus 18 back over the bus to the driver 16. If intended for the driver 16, the driver 16 itself processes the data (consumes the data). If the data received by the driver 16 over the data bus 18 is intended for another component, the driver 16 sends the data over the data bus 18 in a manner logically addressed to the other fixture component.

Optionally, the light fixture 10 may include one or more sensors. By way of example, the drawing shows a single sensor 19. Examples of sensors relating to lighting control include various types of occupancy and ambient light sensors, a temperature sensor or light sensor coupled to the LEDs 11 to provide feedback, or the like. The sensor 19, however, may be a sensor of a type not necessarily used to control the lighting provided by the LEDs 11, such as an ambient temperature sensor, a vibration sensor, an air pressure and/or humidity sensor, a microphone or other audio input device, a still image or video image sensor, etc. The driver 16 may control the light fixture operation, particularly the LEDs 11, in response to data received from the sensor 19 over the data bus 18; and/or the driver 16 may cause communication of sensor data to other equipment via the data bus 18 and either one or both of the wireless transceivers 13, 15. For example, occupancy sensing data from a sensor 19 may be sent to other lighting devices within range using the BLE wireless transceiver 13.

The components shown in FIG. 1 may be integrated into a single box (e.g., in a luminaire) or distributed spatially to any extent that is compatible with successful bus signaling. For example, the light source 11 and possibly the driver 16 may be in the luminaire component and some or all of the other electronics 13, 15, 19 may be located separately and connected to the source 11 and possibly the driver 16 within the luminaire via the data bus 18.

The wireless transceivers 13, 15 are configured to implement time division multiple access (TDMA) radio communications over the respective first and second frequency bands. The wireless transceivers 13, 15 implement the TDMA communication procedure in response to at least some data received by either one or both of the wireless transceivers 13, 15 over the data bus 18 provided by the LED driver 16. At a high level, pertinent data on the bus relates to communications over the overlapping frequency bands. At a time when wireless transceiver 13 is using the first radio frequency band, e.g. for BLE communication, the other wireless transceiver 15 refrains at least from transmitting over the second radio frequency band, e.g. for WiFi communication. Conversely, when wireless transceiver 15 is using the second radio frequency band, e.g. for WiFi communication, the other wireless transceiver 13 refrains at least from transmitting over the first radio frequency band, e.g. for BLE communication. Terms such as first and second are used here to refer to BLE and WiFi only for clarity, and the use of such terms is not limiting and for example does not indicate any particular order or priority.

Signaling over the control channel provided by the general purpose data bus 18 therefore enables control of the wireless transceivers to provide coexistence on the overlapping frequency bands via time division multiplex (TDM) operation. Such TDMA control may apply to two or more or any higher number of RF wireless transceivers of any two or more types. The bus may be extended spatially, e.g. between circuits on a chip, chips on a board, circuit boards in a box, or separate boxes in a space. Much greater flexibility is enabled than by the prior art.

To summarize the example, in a light fixture 10, the driver 16 communicates with a BLE wireless transceiver 13, a WiFi wireless transceiver 15, and optionally a sensor 19 via a data bus 18. Power is derived by the driver from an AC source 17 and supplied to the wireless transceivers 13, 15 and the sensor 19, via a DC bias on the data bus 18 or via a separate power and ground. The driver 16 also controls an LED light source 11. The data bus 18 conveys data to and from the wireless transceivers 13, 15, and from the sensor 19 to the driver 16. The data bus 18 also conveys commands and data from the driver to the other devices 13, 15, 19.

In one class of time division control, a controller such as the driver 16 uses the auxiliary channel on the data bus 18 to tell each transceiver on the bus when the particular wireless transceiver may use its RF frequency band, preventing interference among the radio protocols using the same (total overlapping) band or partially overlapping frequency bands. With this type approach, the general purpose data bus, that is to say data bus 18 in our example, provides an auxiliary communications channel that links M devices within the light fixture 10, of which at least one is capable of acting as a controller or "driver" and N≤M are wireless transceivers. Commands from the driver 16 to the wireless transceivers 13, 15 orchestrate TDMA of the BLE transceiver 13 and the WiFi the wireless transceiver 15. Signaling collision on the bus is prevented by a bus-specific form of TDM, e.g. by the polling and associated time-separated responses from the other elements on the data bus 18. At a high level, in an implementation of this radio TDMA controlled via the auxiliary channel of the data bus 18 provided by the light source driver, the logic of the driver 16 (e.g. the processor and instructions that configure the processor) enables the driver 16 to communicate over the data bus 16 to control access by the transceivers 13, 15 on the bus to use the respective frequency bands and thus implement the TDMA scheme. In this approach, at a first time, the driver 16 is configured to communicate over the data bus 18 to grant access for the first type wireless transceiver to transmit over the first radio frequency band and to cause the second type wireless transceiver to refrain from transmitting over the second radio frequency band during transmission over the first radio frequency band by the first type wireless transceiver. At another time, the driver 16 communicates over the data bus 18 to grant access for the second type wireless transceiver to transmit over the second radio frequency band and to cause the first type wireless transceiver to refrain from transmitting over the first radio frequency band during transmission over the second radio frequency band by the second type wireless transceiver. A wireless transceiver may request priority by signaling the driver; e.g., a BLE transceiver may usurp WiFi communication upon request or vice versa.

An alternative class of time division control might involve one or both of transceivers merely listening to signaling on the data bus 18 to determine state of communication on the frequency bands of the other transceiver and refraining while the other transceiver is communicating. The same TDM approach, e.g. polling and response, may be used to avoid collisions on the data bus 18. In this alternative type TDMA wireless control, the wireless transceivers 13, 15 may independently implement TDMA type access control to the overlapping frequency bands. In this second approach, the driver 16 is relatively passive. The driver 16 provides the data bus 18 and may control the exchange of data via the bus 18 (e.g. by a polling protocol or the like), but the logic of the driver 16 does not necessarily dictate the access timing by the different radio transceivers 13, 15. With this approach, each radio transceiver 13 or 15 provides data on the data bus 18 to effectively signal usage of the respective radio frequency band. The signaling may be a specific message between transceivers or may be otherwise standard communication on the data bus 18 to/from the respective transceivers. The signaling may relate to transmission or reception over the respective frequency band. Any other transceiver 13 or 15 (or additional transceiver if any is included) detects such signaling on the data bus 18 and refrains from transmission over its respective frequency band. The other type transceiver refrains at least while the signaling transceiver is transmitting and may refrain while the signaling transceiver is receiving over its respective frequency band.

Figure 2:
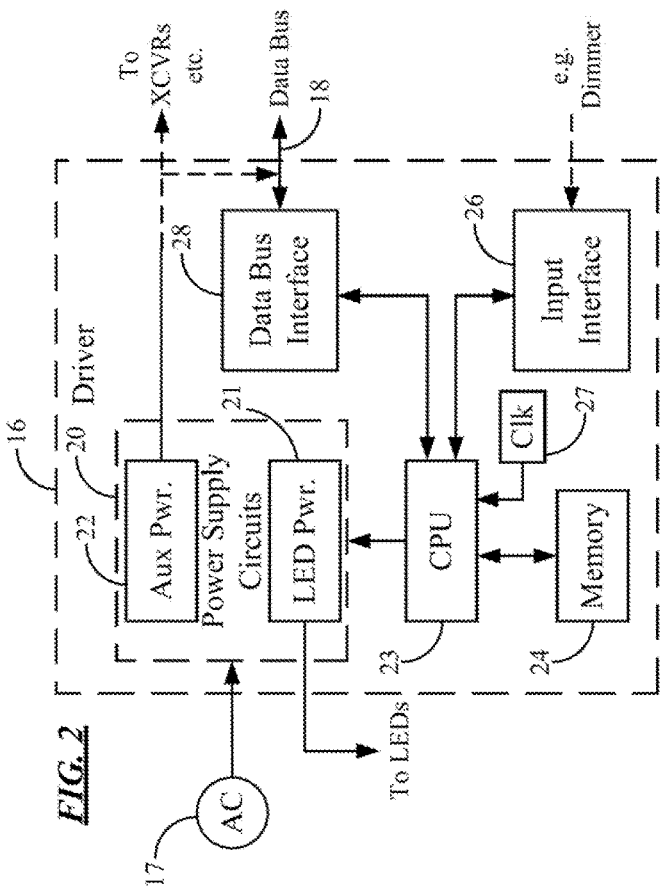
FIG. 2 is a simplified, functional block diagram of an example of a driver, providing a data bus, as may be used in the example light fixture of FIG. 1.

A variety of smart drivers for light sources or other devices may be used to implement the driver 16. It may be helpful to consider a simple/high-level example with respect to the block diagram of FIG. 2. In the example of FIGS. 1 and 2 the source includes a number of LEDs 11 on a single drive channel. Although drivers with additional channels (e.g. for independently controllable sets of LEDS) may be used, for this example, any single-channel LED driver 16 that provides sufficient controllable power to drive the selected LEDs 11 may be used. The driver 16 includes one or more power supplies 20 that obtain power from AC mains 17. One such power supply circuit 21 provides DC power (which may be modulated) to drive the LEDs 11 to emit light for illumination purposes. In the example, the power supply circuits 20 include an additional or auxiliary (Aux) power supply 22. The auxiliary power supply circuit 22 provides power of an appropriate voltage and maximum current to provide power for other electronic components of the light fixture 10, such as the wireless transceivers 13, 15 and the sensor 19 in the example of FIG. 1. The auxiliary power may be provided over the data bus or over a separate power bus (shown as a dotted line arrow).

Examples of suitable drivers 16 are available from eldoLED B.V. The driver 16 may receive power from AC mains, 100V AC to 488V AC, e.g. 120V AC or 220V AC. The driver 16, for example, may be a multi-volt input device capable of driving the LEDs using power obtained from any AC source 17 in a range of 120V AC to 227V. It is also possible to implement the light fixture 10 with a low voltage DC power supply, such as a 24V supply. As another alternative, the light fixture 10 may use a battery power source, as an alternative or a backup to AC mains power. The circuitry of the light fixture 10 may be located remotely from a luminaire that contains the actual LEDs 11, so that only the LEDs are included in the luminaire, and a remotely located driver 16 would connect to the LEDs 11 to supply controlled current to drive the LEDs 11.

The driver 16 in the example also includes processor circuitry in the form of a central processing unit (CPU) 23 along with various memories one of which is shown at 24 for storing instructions for execution by the CPU 23 as well as data having been processed by or to be processed by the CPU 23. The memory 24 for example, may include volatile and non-volatile storage; and the program instructions stored in the memory 24 may include a lighting application (which can be firmware), in this example, for implementing the processor functions of the light fixture including light control functions as wells as communication related functions including some examples of the particular implementations of TDMA where the driver acts as a controller of the TDMA by the wireless transceivers 13, 15. Other TDMA implementations may instead rely on a processor and instructions in one or both of the transceivers as discussed more with respect to FIGS. 3 and 4.

The driver 16 also may include an input interface 25 for suitable connection/communication of the driver 16 with other system elements, such as a light switch, dimmer or the like as a user input to control lighting operations. The driver 16 may also implement a clock (Clk) 27 for timing related functions. The clock 34 may be a specific circuit within the driver 16 or implemented as a program controlled function of the CPU processor 23.

The driver 16 also includes a data bus interface 28 coupled to the CPU 23. The data bus interface 28 is a circuit configured for connection to the wires or for coupling to another type media forming the data bus 18 and for providing appropriate signals over the media of the data bus 18 carrying data for the driver and for other fixture components on the data bus 18. In an eldoLED driver, the bus 18 is a two-wire bus and carries data in a proprietary code protocol. The data bus interface 28 in the driver 16 applies signals to such a bus in the protocol and senses signals on the bus in that protocol that have been applied by other fixture components on the particular media implementation of the data bus 18.

As noted in the discussion above, prior TDM schemes using two or three control wires communicated control states but did not carry information as on a general purpose data bus. In the example with a wire bus that also carries auxiliary DC power, holding the bus low too long by sending a long string of zeroes might cut the power to the devices on the bus. The bus in the example, however, can carry information data as well without potential power cut-off by using a suitable data encoding scheme. Examples using an eldoLED driver utilize Manchester encoding to send data over the bus 18 without sending too many consecutive zeroes.

The two-wire bus and associated interface are described here by way of non-limiting examples only. It should be apparent that data busses using more than two wires, non-electrical (e.g., optical) busses, and wireless busses may be used in a light fixture 10; and for such alternate bus implementations, the driver 16 would have a corresponding alternate implementation of the data bus interface 28.

The driver 16 may be implemented as a suitable chip set or may be implemented as a single microchip device. In a single chip example, the power supplies 20, the CPU 23, the memory 24, the input interface 26, any circuitry of the clock 27, and the data bus interface 28 are all included on a single chip and sometimes referred to as a "system on a chip" or SoC implementation of a driver.

Figure 3:
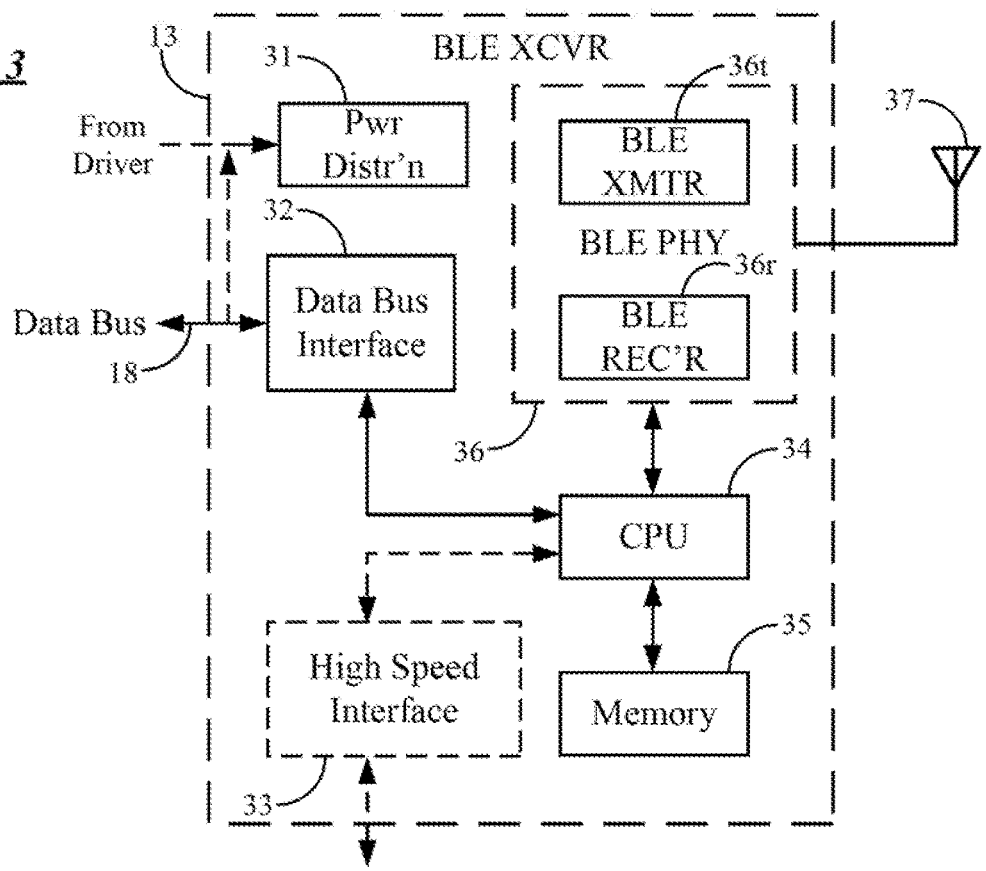
FIG. 3 and FIG. 4 are simplified, functional block diagrams of two examples of transceivers that may be used in the example light fixture of FIG. 1.
Figure 4:
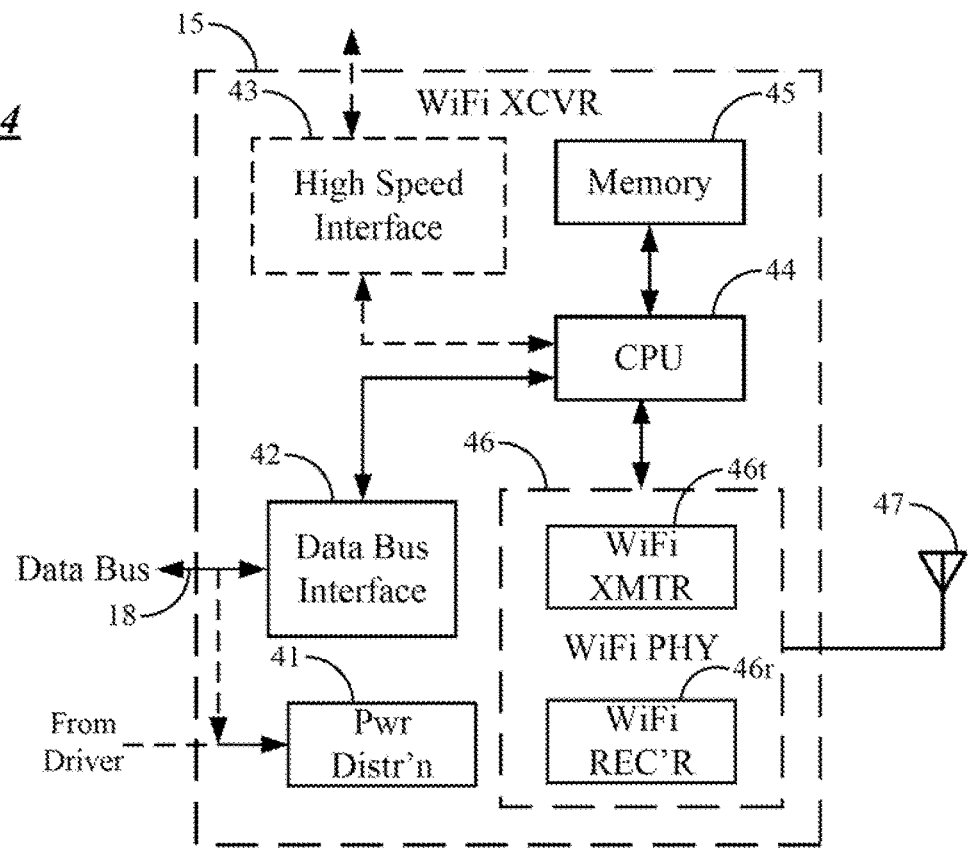

Although additional transceivers may be included, the example light fixture 10 includes two transceivers of different types communicating over radio frequency bands that may be the same but at least somewhat overlap. Typical examples of radio-frequency wireless transceivers suitable for lighting device or lighting system applications include WiFi transceivers; BLE or other Bluetooth transceivers; third-generation (3G), fourth-generation (4G), fifth-generation (5G) or higher cellular transceivers, Zigbee transceivers, sub-gigahertz (e.g. 900 MHz) personal area network (PAN) transceivers, or the like. For purposes of discussion of a specific example, the fixture 10 of FIG. 1 includes a BLE type wireless transceiver 13 and a WiFi type wireless transceiver 15. Such example transceivers may be built in a variety of different configurations. It may be helpful to consider simple/high-level examples of two different types of transceivers with respect to the block diagrams of FIGS. 3 and 4. BLE and WiFi are used here by way of non-limiting examples only. FIG. 3 illustrates an example of the BLE type wireless transceiver (XCVR) 13, and FIG. 4 illustrates an example of the WiFi type wireless transceiver (XCVR) 15.

The BLE wireless transceiver 13 of FIG. 3 includes power distribution circuitry 31, which draws power from the driver 16 (FIGS. 1 and 2), via the data bus 18 (or optionally via a separate power bus shown as a dotted line arrow). The power distribution circuitry 31 converts the received power to one or more voltages and/or current levels suitable to power the various electronic circuits of the BLE wireless transceiver 13. The WiFi wireless transceiver 15 of FIG. 4 includes power distribution circuitry 41 that similarly draws power from the driver 16 and converts the received power to one or more voltages and/or current levels suitable to power the various electronic circuits of the WiFi transceiver 15. In the examples of FIGS. 2 to 4, the driver 16 provides power, which typically involves a wired connection. Where the data bus 18 is wireless (e.g. RF or optical), there may be no such connection, in which case one or both transceivers may draw power from another source (not shown).

The BLE wireless transceiver 13 includes a data bus interface 32, and the WiFi wireless transceiver 15 includes a data bus interface 42. The data bus interfaces 32, 42 of the transceivers are generally similar to the data bus interface 28 of the driver 16 (FIG. 2), in that each of the interfaces 32, 42 is a circuit configured for connection to the wires or coupling to other type media, forming the data bus 18. The data bus interface circuits 32, 42, like the data bus interface 28, also are configured for providing appropriate signals over the media of the data bus 18 carrying data from the respective wireless transceiver 13 or 15 and for sensing data signals on the data bus 18 to recover data for use by the respective wireless transceiver 13 or 15.

Optionally, the BLE wireless transceiver 13 may include a high speed data interface 33, and the WiFi wireless transceiver 15 may include a high speed data interface 43. If included, such additional interfaces 33, 43 would be configured to provide high speed data exchange over a suitable higher speed data bus media (not shown), for example, between the respective wireless transceivers 13, 15, e.g. for any application involving exchange of data in which the transceivers support two types of radio communications at data rates higher than available over the data bus 18 provided by the driver 16.

The illustrated example transceivers 13, 15 are smart devices in that they include processor and memory capabilities for programmed operational control and data processing. Hence, the BLE transceiver 13 includes a central processing unit (CPU) 34 and one or more memories shown collective at 35 storing program instructions (which can be firmware) and configuration data, for implementing communications and any other operations to be implemented by the logic of the transceiver 13. Similarly, the WiFi transceiver 15 includes a central processing unit (CPU) 44 and one or more memories shown collective at 45 storing program instructions (which can be firmware) and configuration data, for implementing communications and any other operations to be implemented by the logic of the transceiver 15. The circuitry of the CPUs may be thought of as individual processors configured upon execution of program instructions from the respective memories.

Each wireless transceiver 13 or 15 also includes physical (PHY) layer circuitry including components for transmitting and receiving RF wireless signals carrying data and associated circuitry interfacing to the respective CPU for exchange of the data and for receiving operational control instructions from the respective CPU. Although other circuitry such as digital signal processors, analog-to-digital and digital-to-analog converters, filters and amplifiers may be included; for simplified illustration purposes, the BLE PHY circuitry 36 and the WiFi PHY circuitry 46 are shown as including respective transmitters and receivers. Hence, the BLE PHY circuitry 36 includes a BLE transmitter 36$t$ and a BLE receiver 36$r$; and the WiFi PHY circuitry 46 includes a WiFi transmitter 46$t$ and a WiFi receiver 46$r$.

Each PHY circuitry connects to one or more antennas in or coupled to the respective transceiver. Hence, the BLE PHY circuitry 36 connects to one or more antennas (collectively shown as one antenna 37) specifically configured for two way wireless communication in the BLE frequency band. Similarly, WiFi PHY circuitry 46 connects to one or more antennas (collectively shown as one antenna 47) specifically configured for two way wireless communication in the WiFi frequency band. Where the overlap of the relevant frequency bands is particularly substantial, it may be feasible to use a single antenna or possibly a single transmit antenna and a single receive antenna for use by both transceivers 13 and 15.

Each of the transceivers 13, 15 shown by way of examples in FIGS. 3 and 4, may be implemented as a system on a chip (SoC), although they could be implemented as more separate individual components, with each illustrated component formed of one, two or more interconnected chips. Alternatively, the two transceivers might be implemented on a single combined system on a chip, for example, incorporating the different PHY circuits for BLE and WiFi but including only one set of the other components (e.g. the CPU, memory, bus interface).

Each transceiver 13 or 15, in the example, includes programming in a memory 35 or 45. At least a portion of the programming configures the CPU (processor) 34 or 44 to control communications over a respective wireless communication frequency band using the applicable protocol.

In this way, the two PHY layer circuits 36, 46, as controlled by the associated processors (CPUs) 34, 44, are configured to communicate over two frequency bands defined by the respective protocol standards, in this case by the BLE standard and the WiFi standard respectively. The bands, however, are not entirely separate and overlap at least to some degree as specified in the two otherwise different standards. The communication over the two frequency bands, however, does not occur simultaneously because the transceivers 13, 15 implement a TDMA scheme responsive to the data on the data bus 18, to enable coexistence of the two types of wireless communication in the overlapping frequency bands. In one implementation, the driver 16 controls the TDMA access by providing appropriate commands or instructions to the transceivers 13, 15 over the data bus 18. As shown in FIGS. 3 and 4, the transceivers are relatively smart devices. As a result, transceivers 13, 15 may implement the TDMA scheme independent of the high level logic of the driver 16, for example, based on programming of the processors of the transceivers and monitoring of or listening to communications on the data bus 18. In this later approach, the driver 16 provides the data bus 18 but is not the controller or master of the transceivers 13, 15 for TDMA purposes; and the transceivers 13, 15 need not be responsive to commands or instructions related to TDMA from the driver 16.

Figure 5:
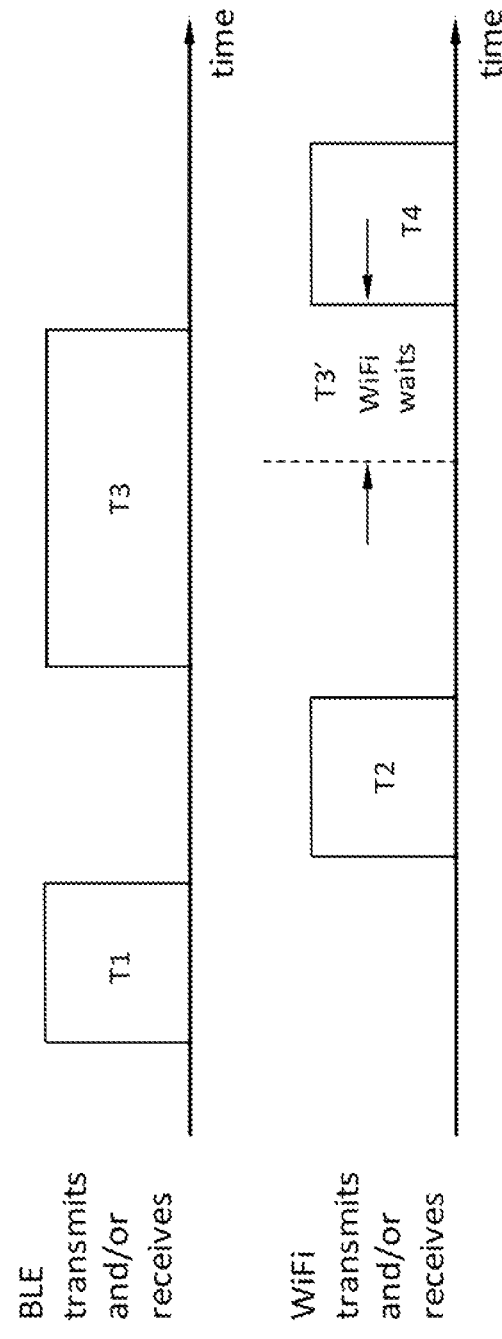
FIG. 5 is a timing diagram illustrating an example of time division multiplexing of operations of the transceivers of the example light fixture of FIG. 1.

By way of an example, using BLE and WiFi as in the light fixture 10, FIG. 5 is a timing diagram illustrating time relationships for RF channel use. BLE transceiver 13 operates in interval T1; and during that interval T1, the WiFi transceiver 15 refrains from transmitting. Then, the WiFi transceiver 15 operates in interval T2; and during that interval T2, the BLE transceiver 13 refrains from transmitting. Similarly, in interval T3, the BLE transceiver 13 transmits data over-the-air; and the WiFi transceiver 15 refrains from transmitting. If the WiFi transceiver 15 has data to send, e.g. in the later portion T3' of the internal, the WiFi transceiver 15 waits. Then, in interval T4, the BLE transceiver 13 is done transmitting; and the WiFi transceiver 15 operates to send its data.

The driver 16 may control TDMA access operations such as those shown in the simple example of FIG. 5. Alternatively, such timed operations may be implemented by the transceivers 13, 15 monitoring each other's activities on the data bus 18.

In a driver controlled implementation of the TDMA, for example, during the interval T3, at the time approximately indicated by vertical dashed line in FIG. 5, the WiFi transceiver 15 sends a request to the driver 16 to use of the RF channel (2.4 GHz band). Since the BLE transceiver 13 is already operating on its frequency band (including some or all of the 2.4 GHz band), the driver 16 responds to the new request by allowing BLE operation until the end of interval T3. The driver may 16 send an instruction to the WiFi transceiver 15 to wait, or the WiFi transceiver 15 may wait until the driver 16 sends a positive instruction to begin transmission. In either case, at the end of interval T3, the driver 16 controls the transceivers 13, 15 to switch to WiFi operation for interval T4.

Note: the diagram in FIG. 5 represents RF transmissions of the two types and does not show bus activity, which carries on independently of RF activity. Also, in an example like that of FIG. 5, either wireless transceiver or the sensor may be exchanging data with the driver 16 over the data bus 18 at any time, regardless of which transceiver 13 or 15 is using the 2.4 GHz band.

It may be helpful to discuss the driver controlled technique, by way of a somewhat more specific TDMA example. In the light fixture 10, an auxiliary communications channel via the data bus 18 links M devices, of one which at least is capable of acting as a controller or "driver" and N≤M are wireless radio frequency transceivers. Some of the wireless transceivers compete spectrally with others. In the example, the driver 16 is the controller of wireless TDMA operations and uses the data bus 18 to control TDMA operations of the competing-technology transceivers 13, 15. An example of a non-radio device is an environmental sensor 19.

The auxiliary channel functions as a general purpose data "bus," meaning that all attached devices share the channel physically at all times; thus, a signal placed on the data bus 18 by any device 16, 13, 15 or 19 is detectable by any other device on the bus. The driver 16 also provides power, for example, via the data bus 18. In an example, the data bus 18 is a pair of conducting wires (FIG. 1), but buses having more than two wires, non-electrical (e.g., optical) buses, and wireless buses may also be used to implement data bus 18. All devices on the data bus 18 are equipped to send and/or receive signals via the data bus in a manner intelligible to other devices on the data bus 18. All of the devices on the data bus 18 have sufficient computational capability to execute commands received via the data bus 18 and/or to encode data for transmission via the data bus 18.

Via the data bus 18, the driver 16 can transmit information to at least the N wireless transceivers and may receive information from one or more of the other devices (including, the wireless transceivers 13, 15). Also, in various embodiments non-driver devices can exchange information with each other. The driver is preferably a distinct device (FIG. 1) but may be integral to a wireless transceiver or other device on the data bus 18. The driver 16 receives power from some source, e.g., an AC or DC power line (FIG. 1), provides power to M−1 other devices as a DC (constant) voltage on the two-wire version of the data bus 18, and may control additional non-bus connected devices, such as the LED light source 11.

In the example, data may be conveyed by a Manchester or other encoded binary signal superimposed on the DC voltage on the two-wire data bus 18. Where the bus 18 carries auxiliary power, for example, the encoding enables data communication over the bus while avoiding possibly sending too many consecutive zeros that might otherwise cause power to the other devices to collapse.

Collision of data signals on the data bus (attempted simultaneous transmission by more than one device) is prevented by multiplexing, preferably though not necessarily time-division multiplexing, whereby only one device signals on the bus at a time. For example, the driver 16 may poll each of the M−1 other devices on the data bus, and each of the M−1 other devices only responds to polling signaling uniquely directed to the respective other device. In that way, each of the M−1 other devices only applies data to the two-wire data bus at a times responsive to a polling of the respective other device. Many protocols for bus communication and TDM control are possible and may be used as alternatives to the protocol outlined above.

In the driver controlled TDMA example, the driver 16 applies commands on the data bus 18 prefaced by distinct addresses for N wireless transceivers. In the two-wire bus example, each address may be an 8-bit word (N≤2⁸), and commands consist of one or more 8-bit words. If a device recognizes its address, it executes the associated command; a device does not recognize an address in a messages as its own address, such a device on the bus ignores the command message. In this way, for example, a particular wireless transceiver 13 or 15 may be ordered to be active for a specified time interval, may be ordered to be inactive for a specified time interval, or may be ordered to transmit data to the driver via the bus, such as data received by the transceiver via its RF capability.

Such an example of a light fixture 10 uses of an auxiliary, general-purpose, shared data channel (the data bus 18) and a controller (the driver 16) to orchestrate TDM coexistence of any number or kinds of radio transmitters and data exchange with any number of additional devices, e.g., sensors.

Examples also may allow any number of RF transmission types competing for any number of RF channels to coexist under the control of a single driver 16. The only constraints on how many RF devices and frequency bands can coexist are based practical implementations of the light fixture circuitry, e.g., whether bus bandwidth in a particular bus/driver configuration is high enough to handle all necessary commands and data for a particular number and types of wireless transceivers.

A single driver may control multiple busses, each bus linked to a distinct set of devices. There is no requirement to have all devices on a single bus.

Multiple wireless transceivers of each RF type may be operated simultaneously. For example, the driver 16 may turn on several Bluetooth transceivers at once while silencing several WiFi transceivers.

The driver 16 can prioritize any RF type, or any individual RF transceiver or subgroup of RF transceivers, according to any criteria whatever, including instructions received from an outside source (e.g., a back end device or service) or data received from wireless transceivers on the bus 18. For example, an implementation similar to that of a three-wire TDM, but using the general purpose data bus 18 provided by the LED driver 16 might enable the Bluetooth transceiver to override the WiFi transceiver, but not vice versa, while the driver and bus enable either type wireless transceiver to be assigned priority for any particular period of time.

Wireless transceivers 13, 15 may request time from the driver 16 via the data bus 18. The driver 16 may condition its commands to the transceivers partly on such requests. For example, a WiFi transceiver may request use of some or all of the 2.4 GHz band while a Bluetooth transceiver is using the band; and the driver may allow the Bluetooth transceiver to continue operating for an interval, then switches permission to the WiFi transceiver.

The data "bus" may itself be a wireless modality, e.g., one of the modalities that coexist via TDM. For example, a driver may use Bluetooth to communicate with a Bluetooth+WiFi enabled device, a number of Bluetooth transceivers, and a number of Bluetooth-equipped sensors. The driver would achieve TDM by silencing both itself and all other Bluetooth devices during time intervals it allotted for WiFi function. Greatest simplicity is found in the case where the data bus is a physical pair of wires. A pair of wires is superior to a single conductor for basic electrical reasons.

Figure 6:
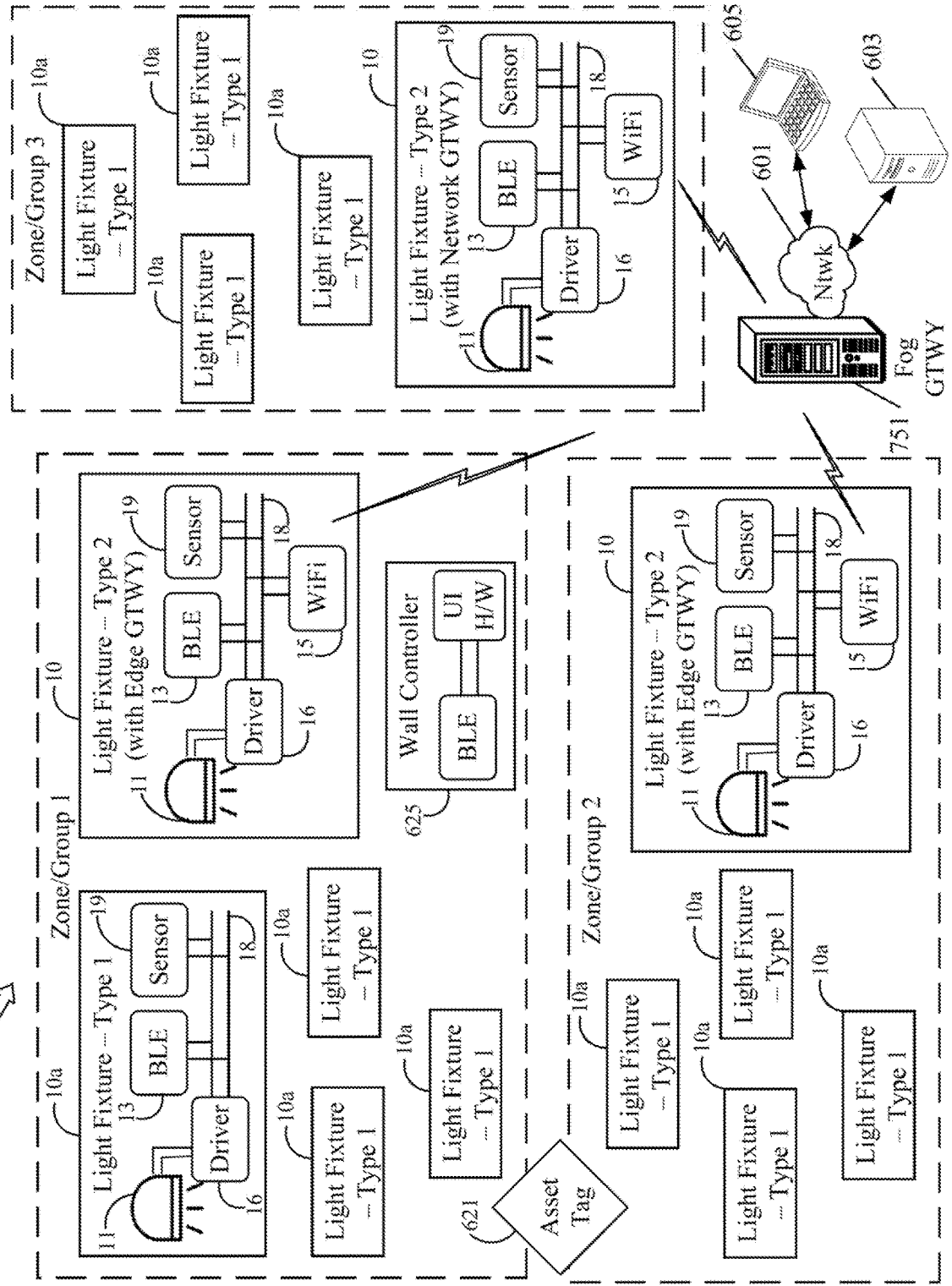
FIG. 6 is a simplified, functional block diagram of an example of a system of lighting fixtures and other equipment, where at least several of the light fixtures may be similar to the example light fixture of FIG. 1 and implement time division multiplexing such as that shown in the timing example of FIG. 5.

FIG. 6 illustrates a system 600 of wireless enabled light fixtures 10, 10a distributed about a space, for example, in or around a building at a premises. Each of the wireless enabled light fixtures 10 or 10a includes a light source such a LED source 11, a light source driver 16 having a power supply to drive the light source 11 and a data bus interface. Each wireless enabled light fixture 10 or 10a further includes a data bus 18 provided by the interface of the driver 16, and a first wireless transceiver coupled to that data bus 18. Although other types of wireless transceivers could be used as the first type of transceiver that is included in all of the fixtures 10, 10a; in the example system 600, the first transceiver is a BLE type transceiver 13 configured to communicate over a first radio frequency band, e.g. over the band specified in the BLE standard. Some or all of the light fixtures 10, 10a may include sensors 19.

In the drawing, the fixtures 10a are indicated as type 1 light fixtures in that they may only have one wireless transceiver, e.g. only the BLE transceiver 13. Alternatively, they may include additional transceivers, but those transceivers may be inactive (e.g. awaiting activation to reconfigure a type 1 fixture 10a as a type 2 fixture 10). In such a single transceiver or single active transceiver implementation, the type 1 light fixtures 10*a* need not implement TDMA.

In the system example 600, each of two or more respective wireless enabled light fixtures, referred to as type 2 light fixtures 10, further includes a second wireless transceiver coupled to the data bus 18 provided by the interface of the driver 16 of the respective light fixture 10. The second wireless transceiver is of a second type different from the first type. Although other types of wireless transceivers could be used as the second type of transceiver in light fixtures 10; in the example system 600, the second wireless transceiver is a WiFi transceiver 15. Each second (e.g. WiFi) wireless transceiver 15 is configured to communicate over a second radio frequency band (e.g. the band allocated for WiFi) that at least partially overlaps the first frequency band.

The elements 11 to 19 of the light fixtures 10, 10*a* may be implemented by correspondingly numbered elements/circuits as described above relative to the example light fixture components in FIGS. 1 to 4. In each of the respective wireless enabled light fixtures 10, the wireless transceivers are configured to implement TDMA controlled radio communications over the respective first and second frequency bands, in response to at least some data received by either one or both of the wireless transceivers 13, 15 over the data bus 18 provided by the interface in the driver 16 of the respective light fixture 10, as described in any of the earlier examples.

The light fixtures 10, 10*a* of the system 600 are arranged to provide general illumination about a premises of operations. In the system 600, however, the light fixtures 10 having two active wireless transceivers 13, 15 may be configured for an additional communications related function. For example, each of the type 2 light fixtures 10 may have programming in a memory accessible to one of the processors of the fixture 10 configuring the respective light fixture 10 as an edge gateway with respect to a number of others of the wireless enabled light fixtures 10*a*. At a high level, in the BLE/WiFi example, light fixtures 10, 10*a* in a zone or group (three of which are shown by way of a non-limiting example) may communicate with each other via BLE. The lighting fixtures 10, 10*a* in a group in turn may be arranged to provide general illumination in a respective zone or area of the premises. The lighting fixtures 10 provide a gateway between the BLE based light fixture communications of the respective groups and a WiFi network that includes all of the type 2 light fixtures 10 and a fog gateway 751.

The system 600 in the example of FIG. 6 therefore also includes the fog gateway 751. An example of that gateway 751, discussed later with respect to FIG. 7, includes a wireless transceiver of the second type wireless transceiver (e.g. another WiFi transceiver) configured for wireless network communications with the respective wireless enabled light fixtures 10 using the second radio frequency band (e.g. the band allocated for WiFi). The fog gateway 751 also includes a data network interface for communication via a data network 601 with other computers 603, 605.

The data network 601 may be a local area network or a wide area network such as an intranet or the public Internet. The drawing shows a host or server type network connected computer 603 and a laptop type user terminal device 605 as non-limiting examples of external equipment that may communicate with the system 600 via the network 601 and the fog gateway 751, for various data gathering or control purposes.

As will be described in more detail later relative to FIG. 7, a processor in the fog gateway 751 is coupled to the second type wireless transceiver of the fog gateway 751 and the data network interface. The processor is programmed or otherwise configured to cause the fog gateway 751 to provide a gateway between wireless network communications via the second type (e.g. WiFi) transceivers of the respective wireless enabled light fixtures 10 using the second (e.g. WiFi) radio frequency band and the data network 601.

The edge gateway functionalities in light fixtures 10 may serve to translate messages received via BLE from other light fixtures into communications suitable for exchange with the fog gateway 751, for example, via WiFi. The edge gateway functionalities in light fixtures 10 may serve to translate messages received from the fog gateway 751 over WiFi for communication to other light fixtures 10*a* over BLE.

The drawing shows an example of an asset tag 621 at a location in the premises served by the system 600. Although not shown, the asset tag 621 includes circuitry, such as a BLE transmitter or an RFID transmitter, with a unique identifier that is detectable by the BLE transceiver and/or a sensor in the light fixtures 10, 10*a*. The system 600 may include other wireless enabled devices, such as the wall controller device 625. The example wall controller 625 includes a BLE transceiver, similar to the transceivers 13. The example wall controller 625 also includes user interface (UI) hardware (H/W), such as one or more switches, a dimmer setting input device, a keypad, audio or visual feedback elements, a touch pad or touchscreen, or the like. The edge gateway functionalities in light fixtures 10 may serve to also translate messages received from or generated in response to communications from other devices at the premises via BLE, such as the asset tag 621 and the wall controller 625, into communications suitable for exchange with the fog controller 751 via WiFi. The edge gateway functionalities in light fixtures 10 may serve to also translate messages from the fog gateway 751 for communication to such other devices, such as the wall controller 625.

The communications through the edge gateway functionalities of the light fixtures 10 may relate to lighting operations. Lighting related communications, for example, may include lighting related sensor data or light fixture status/health data to be sent upstream to the fog gateway 751. Non-lighting sensor data may be similarly sent upstream to the fog gateway 751. In the downstream direction from the fog gateway 751, lighting related communications, for example, may include lighting commands (e.g. turn ON LEDs 11, turn OFF LEDs 11, dimming or the like); configuration setting data (e.g. to define members of a control group, to designate a light fixture to act as a zone controller or as an edge gateway in a group, or the like); or software or firmware updates for the light fixtures 10, 10*a* and possibly for a wall controller 625.

For more information about asset tracking via a system like system 600, attention may be directed to U.S. patent application Ser. No. 15/916,861, filed Mar. 9, 2018, entitled, "Asset Tag Tracking System and Network Architecture," the entire disclosure of which is incorporated herein by reference. Although somewhat different types of transceivers are used for the wireless communications among light fixtures, more information regarding a protocol and procedures for wireless communications amongst light fixtures, wall switches, at least one gateway, etc. may be found in U.S. Pat. No. 9,883,570 issued Jan. 30, 2018, entitled "Protocol for Lighting Control via a Wireless Network," the entire disclosure of which is incorporated herein by reference.

In the system 600, the type 2 light fixtures 10 configured as the edge gateways implement TDMA control of the BLE transceiver 13 and the WiFi transceiver as described above relative to FIGS. 1 to 5.

The fog gateway 751 is configured for wireless data communication with the type 2 light fixtures 10 configured as edge gateways. For example, the fog gateway 751 may be configured with a WiFi radio frequency transceiver that is compatible with the WiFi radio frequency transceiver 15 of each of the light fixtures 10. Although the gateway 751 may use special purpose hardware, the example utilizes an appropriately programmed computer platform.

Figure 7:
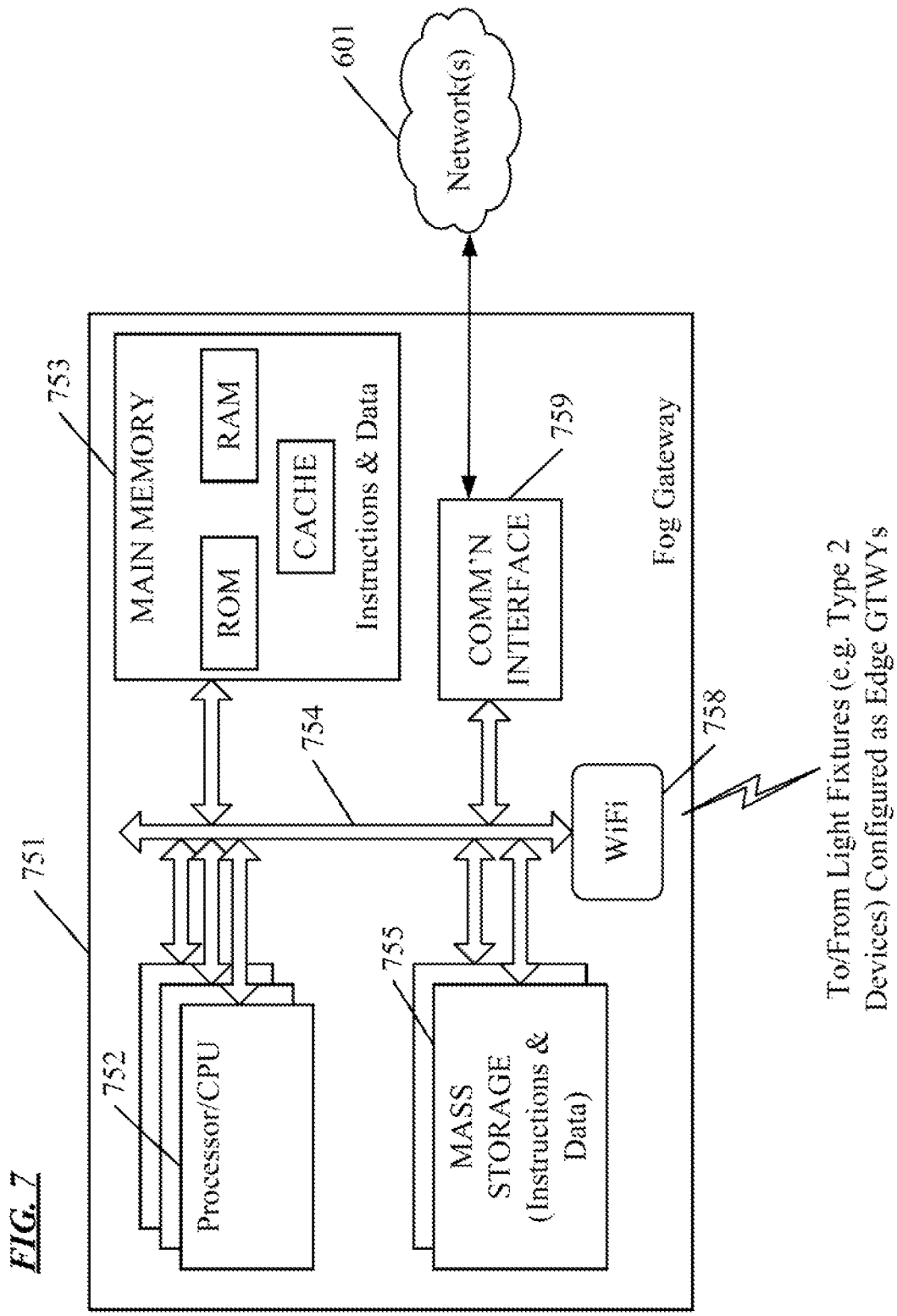
FIG. 7 is a simplified, functional block diagram of an example of a hardware platform for a fog gateway, as may be used in the example system of FIG. 6.

FIG. 7 is a functional block diagram of a general-purpose computer system 751, by way of just one example of a hardware platform that may perform the functions of the fog gateway. The example 751 will generally be described as an implementation of a server or host type computer, e.g. as might be configured as a blade device in a server farm or in network room of a particular premises. Alternatively, the computer system may comprise a mainframe or other type of host computer system capable of web-based communications, media content distribution, or the like via the network 601 and the on-premises WiFi network formed with type 2 light fixtures 10.

The computer system 751 in the example includes a central processing unit (CPU) 752 formed of one or more processors, a main memory 753, mass storage 755 and an interconnect bus 754. The circuitry forming the CPU 752 may contain a single microprocessor, or may contain a number of microprocessors for configuring the computer system 751 as a multi-processor system, or may use a higher speed processing architecture. The main memory 753 in the example includes ROM, RAM and cache memory; although other memory devices may be added or substituted. Although semiconductor memory may be used in the mass storage devices 755, magnetic type devices (tape or disk) and optical disk devices may be used to provide higher volume storage. In operation, the main memory 753 stores at least portions of instructions and data for execution by the CPU 752, although instructions and data are moved between memory 753 and storage 755 and the CPU 752 via the interconnect bus 754.

The computer system of the fog gateway 751 also includes one or more input/output interfaces for communications, shown by way of example as interface 759 for data communications via the network 601 as well as a WiFi type wireless transceiver 758. Each interface 759 may be a high-speed modem, an Ethernet (optical, cable or wireless) card or any other appropriate data communications device. The physical communication link(s) to/from the interface 759 may be optical, wired, or wireless (e.g., via satellite or cellular network). Although other transceiver arrangements may be used, the example fog gateway 751 utilizes a WiFi type wireless transceiver 758 similar to the WiFi type wireless transceivers 15 in the light fixture and component examples of FIGS. 1 and 4 described above. The WiFi type wireless transceiver 758 enables the fog gateway 75 to communicate over-the-air with the WiFi type wireless transceivers 15 in the edge gateways implemented in light fixtures 10 in the system 600 of FIG. 6.

If the fog gateway 751 were a multi-radio technology device, e.g. if gateway 751 included a BLE transceiver in addition to the WiFi transceiver 758, the fog gateway 751 may implement TDMA control of the wireless transceivers as described above. In the example, although radio might be used for the link to the network 601, it is assumed that either the WiFi transceiver 758 is the only wireless transceiver in the fog gateway 751 or that any other wireless transceiver uses a frequency band that does not overlap the WiFi frequency band. Hence, in the example, the fog gateway 751 need not implement the TDMA.

Although not shown, the computer platform configured as the fog gateway 751 may further include appropriate input/output ports for interconnection with a local display and a keyboard and mouse or with a touchscreen or the like, serving as a local user interface for configuration, programming or trouble-shooting purposes. Alternatively, the operations personnel may interact with the computer system of the fog gateway 751 for control and programming of the system from remote terminal devices via the Internet or some other link via any network 601.

The computer system implementing the fog gateway 751 runs a variety of applications programs and stores various information in a database or the like for control of the fixtures, wall controllers and any other elements of the lighting system 600 and possibly elements of an overall building managements system (BMS) at the premises. One or more such applications, for example, might enable asset tracking, lighting control through the fog gateway and/or lighting control based on input from the sensors 19 or the wall controller 625.

The example FIGS. 6 and 7 show a single instance of a fog gateway 751. Of course, the fog gateway functions may be implemented in a distributed fashion on a number of similar platforms, to distribute the processing load. Additional networked systems (not shown) may be provided to distribute the processing and associated communications, e.g. for load balancing or failover.

The hardware elements, operating systems and programming languages of computer systems like that of the fog gateway 751 generally are conventional in nature, and it is presumed that those skilled in the art are sufficiently familiar therewith to understand implementation of the present system and associated lighting control technique using suitable configuration and/or programming of such computer system(s).

In the example, the fog gateway 751 has only one type of wireless transceiver, e.g. the WiFi wireless transceiver 758. In such a configuration, the fog gateway need not implement TDMA. Instead, the edge gateways with which the fog gateway 751 communicates implement TDMA as discussed in detail above. If for some reason it was desirable for the fog gateway 751 to include a second type wireless transceiver using an overlapping frequency band, e.g. a BLE type wireless transceiver, then the fog gateway 751 might implement a similar TDMA technique for coexistence (although typically, the fog gateway 751 would not utilize a driver and a driver provided data bus to control the TDMA). Also, the light fixtures 10a, having or only currently utilizing BLE transceivers 13 need not implement TDMA.

As outlined above, the TDMA access control is implemented by configuration of a driver 16 of a light fixture 10 and/or one or more transceivers 13, 15 communicating with the driver 16 via a data bus 18 provided by the driver 16. In several examples, the driver 16 or one or more transceivers 13, 15 includes a processor, and the configuration for the TDMA access control is implemented by appropriate programming for the appropriate processor(s) of the light fixture 10. Software or firmware programming for the processor(s) of a light fixture 10, including for the TDMA access control, may be communicated to and installed in memories of any or all such light fixtures 10 via a network, including over-the-air via the wireless communications of the system of FIG. 6. Such software or firmware communications may originate on the fog gateway 751 or a computer like 603 or 605 that accesses the system 600 via the network 601 and the fog gateway 751.

Program or data aspects of the technology discussed above therefore may be thought of as "products" or "articles of manufacture" typically in the form of executable programming code (firmware or software) or data that is carried on or embodied in a type of machine readable medium. This programming and/or control data is configured to implement TDMA wireless operations in one or more of the ways described above.

"Storage" type media include any or all of the tangible memory of lighting fixtures 10 or drivers 16 or transceivers 13, 15 thereof, as well as various computer platforms, such as that of the fog gateway 751, a host or server computer 603 or user terminal 605 on an external network 601, or any of the various processors or the like, such as various volatile or non-volatile semiconductor memories, tape drives, disk drives and the like, which non-transitory devices may provide storage at any time for executable software or firmware programming and/or any relevant data or information. All or portions of the programming and/or configuration data may at times be communicated through the Internet or various other telecommunication networks. Such communications, for example, may enable loading of the data or programming from one computer or processor into another, for example, from the fog gateway 751, a management server or host computer of a lighting system or BCAS management system type service provider into any of the light fixtures 10. Thus, another type of media that may bear the programming or data elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible or "storage" media, terms such as computer or machine "readable medium" refer to any medium that participates in providing instructions to a processor for execution.

The programming or data for control TDMA may be embodied in at least one machine readable medium, one or more of which may be non-transitory. For example, if downloaded to a light fixture 10, the programming or data could be stored in a hardware device that serves as the memory/storage of the driver or transceiver(s) of the light fixture. The memory/storage is an example of a non-transitory type of media. By way of another example, at times, executable operational programming, including programming and/or data for the wireless TDMA, may reside in the memory/storage of the fog gateway, a server or user terminal device and be streamed over the network media to one or more light fixtures. In these later examples, the signal(s) on the network would be transitory in nature. However, the buffer memory and any memory or registers internal to the processor memory, or any hardware storage device used by the fog gateway, server or other computer to maintain the programming and any data or to prepare selected programming or data for transmission over the network would be additional examples of non-transitory media.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. Such amounts are intended to have a reasonable range that is consistent with the functions to which they relate and with what is customary in the art to which they pertain. For example, unless expressly stated otherwise, a parameter value or the like may vary by as much as ±10% from the stated amount.

In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected lies in less than all features of any single disclosed example. Thus the following claims are hereby incorporated into the Detailed Description, with each claim standing on its own as a separately claimed subject matter.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. A light fixture, comprising:
 a light source;
 a wireless transceiver of a first type configured to communicate over a first radio frequency band;
 a wireless transceiver of a second type different from the first type, configured to communicate over a second radio frequency band, the second radio frequency band at least partially overlapping the first frequency band;
 a driver configured to supply power to and control operation of the light source and a data bus interface; and
 a data bus provided by the data bus interface of the driver and coupled to support an exchange of data to and from the wireless transceivers,
 wherein the first type wireless transceiver and the second type wireless transceiver are:
  coupled to the data bus provided by the data bus interface of the driver, and
  configured to implement time division multiple access radio communications over the respective first and second frequency bands, in response to at least some data received by the first type wireless transceiver or the second type wireless transceiver over the data bus.

2. The light fixture of claim 1, wherein:
the first type wireless transceiver is a wireless transceiver selected from the group consisting essentially of: a Bluetooth transceiver, a WiFi transceiver, a personal area network transceiver, or a Zigbee transceiver; and
the second type wireless transceiver is a different wireless transceiver selected from the group consisting essentially of: a Bluetooth transceiver, a WiFi transceiver, personal area network transceiver, or a Zigbee transceiver.

3. A lighting system, comprising:
wireless enabled light fixtures distributed about a space, each of the wireless enabled light fixtures including:
a light source; and
a first wireless transceiver of a first type configured to communicate over a first radio frequency band,
each of two respective ones of the wireless enabled light fixtures further including:
a light source driver having a power supply to drive the light source of the respective light fixture and a data bus interface;
a data bus provided by the interface of the driver of the respective light fixture; and
a second wireless transceiver of a second type different from the first type, each second wireless transceiver being configured to communicate over a second radio frequency band, the second radio frequency band at least partially overlapping the first frequency band;
wherein in each of the respective wireless enabled light fixtures, the first type wireless transceiver and the second type wireless transceiver are:
coupled to the data bus provided by the interface of the driver of the respective light fixture; and
configured to implement time division multiple access radio communications over the respective first and second frequency bands, in response to at least some data on the data bus provided by the interface of the driver of the respective light fixture.

4. The system of claim 3, wherein, in each of the respective wireless enabled light fixtures:
the first type wireless transceiver of the respective light fixture is configured to send data over the data bus of the respective light fixture signaling about wireless communication over the first radio frequency band; and
the second type wireless transceiver of the respective light fixture is configured to refrain from transmitting over the second radio frequency band during wireless communication over the first radio frequency band by the first type wireless transceiver of the respective light fixture, in response to the data sent over the data bus of the respective light fixture from the first type wireless transceiver of the respective light fixture.

5. The system of claim 4, wherein, in each of the respective wireless enabled light fixtures:
the second type wireless transceiver of the respective light fixture is configured to send data over the data bus of the respective light fixture signaling about wireless communication over the second radio frequency band; and
the first type wireless transceiver of the respective light fixture is configured to refrain from transmitting over the first radio frequency band during wireless communication over the second radio frequency band by the second type wireless transceiver of the respective light fixture, in response to the data sent over the data bus of the respective light fixture from the second type wireless transceiver of the respective light fixture.

6. The system of claim 3, wherein each of the respective wireless enabled light fixtures further includes a processor and programming in a memory accessible to the processor configuring the respective light fixture as an edge gateway with respect to a number of others of the wireless enabled light fixtures.

7. The system of claim 3, wherein, in each of the respective wireless enabled light fixtures, the driver is further configured to communicate over the data bus of the respective light fixture to:
grant access for the first type wireless transceiver of the respective light fixture to transmit over the first radio frequency band; and
cause the second type wireless transceiver of the respective light fixture to refrain from transmitting over the second radio frequency band during transmission over the first radio frequency band by the first type wireless transceiver of the respective light fixture.

8. The system of claim 7, wherein, in each of the respective wireless enabled light fixtures, the driver is further configured to communicate over the data bus of the respective light fixture to:
grant access for the second type wireless transceiver of the respective light fixture to transmit over the second radio frequency band; and
cause the first type wireless transceiver of the respective light fixture to refrain from transmitting over the first radio frequency band during transmission over the second radio frequency band by the second type wireless transceiver of the respective light fixture.

9. The lighting device of claim 3, wherein:
each first type wireless transceiver is a wireless transceiver selected from the group consisting essentially of: a Bluetooth transceiver, a WiFi transceiver, a personal area network transceiver, or a Zigbee transceiver; and
each second type wireless transceiver is a different wireless transceiver selected from the group consisting essentially of: a Bluetooth transceiver, a WiFi transceiver, personal area network transceiver, or a Zigbee transceiver.

10. The system of claim 3, wherein:
each of the two respective wireless enabled light fixtures further comprises a processor coupled to control internal communications between the transceivers of the respective wireless enabled light fixture; and
the processor is configured to cause the respective wireless enabled light fixture to provide a gateway between wireless network communications via the first type transceiver of the respective light fixture using the first radio frequency band and wireless network communications via the second type transceiver of the respective light fixture using the second radio frequency band.

11. The system of claim 10, further comprising fog gateway including:
a second type wireless transceiver configured for wireless network communications with the respective wireless enabled light fixtures using the second radio frequency band; and
a data network interface; and
a processor, coupled to the second type wireless transceiver of the fog gateway and the data network interface, configured to cause the fog gateway to provide a gateway between wireless network communications via the second type transceivers of the respective wireless enabled light fixtures using the second radio frequency band and a data network.

12. A lighting system, comprising:
first and second groups of wireless enabled light fixtures distributed about a space, each of the wireless enabled light fixtures including:
a light source; and
a wireless transceiver of a first type configured to communicate over a first radio frequency band;
first and second wireless enabled gateway light fixtures configured respectively as gateways for the first and second groups of wireless enabled light fixtures, each respective one of the gateway light fixtures including:
a light source;
a first wireless transceiver of the first type configured to communicate over the first radio frequency band with the wireless enabled light fixtures of the respective first or second group; and
a second wireless transceiver of a second type different from the first type, each second wireless transceiver being configured to communicate over a second radio frequency band at least partially overlapping the first frequency band,
wherein, in each of the first and second gateway light fixtures, the first type wireless transceiver and the second type wireless transceiver are configured to implement time division multiple access radio communications over the respective first and second frequency bands; and
a fog gateway including a wireless transceiver of the second type configured for communication over the second radio frequency band with the second wireless transceivers in the first and second gateway light fixtures.

13. The system of claim 12, wherein:
each respective one of the gateway light fixtures further includes: a light source driver supply power to the light source, and a data bus provided by the driver of the respective gateway light fixture;
the first and second wireless transceivers of each respective gateway light fixture are coupled to the data bus provided by the driver of the respective gateway light fixture; and
the first and second wireless transceivers of each respective gateway light fixture are further configured to implement the time division multiple access radio communications over the respective first and second frequency bands in response to at least some data on the data bus of the respective first or second gateway light fixture.

14. The system of claim 13, wherein, in each respective one of the gateway light fixtures:
the first type wireless transceiver of the respective gateway light fixture is configured to send data over the data bus of the respective gateway light fixture signaling about wireless communication over the first radio frequency band; and
the second type wireless transceiver of the respective gateway light fixture is configured to refrain from transmitting over the second radio frequency band during wireless communication over the first radio frequency band by the first type wireless transceiver of the respective gateway light fixture, in response to the data sent over the data bus of the respective gateway light fixture from the first type wireless transceiver of the respective gateway light fixture.

15. The system of claim 14, wherein, in each respective one of the gateway light fixtures:
the second type wireless transceiver of the respective gateway light fixture is configured to send data over the data bus of the respective gateway light fixture signaling about wireless communication over the second radio frequency band; and
the first type wireless transceiver of the respective gateway light fixture is configured to refrain from transmitting over the first radio frequency band during wireless communication over the second radio frequency band by the second type wireless transceiver of the respective gateway light fixture, in response to the data sent over the data bus of the respective gateway light fixture from the second type wireless transceiver of the respective gateway light fixture.

16. The system of claim 13, wherein, in each respective one of the gateway light fixtures, the driver is further configured to communicate over the data bus to of the respective gateway light fixture to:
grant access for the first type wireless transceiver of the respective gateway light fixture to transmit over the first radio frequency band; and
cause the second type wireless transceiver of the respective gateway light fixture to refrain from transmitting over the second radio frequency band during transmission over the first radio frequency band by the first type wireless transceiver of the respective gateway light fixture.

17. The system of claim 16, wherein, in each of the respective wireless enabled light fixtures, the driver of the respective gateway light fixture is further configured to communicate over the data bus of the respective gateway light fixture to:
grant access for the second type wireless transceiver of the respective gateway light fixture to transmit over the second radio frequency band; and
cause the first type wireless transceiver of the respective gateway light fixture to refrain from transmitting over the first radio frequency band during transmission over the second radio frequency band by the second type wireless transceiver of the respective gateway light fixture.

18. The lighting device of claim 12, wherein:
each first type wireless transceiver is a wireless transceiver selected from the group consisting essentially of: a Bluetooth transceiver, a WiFi transceiver, a personal area network transceiver, or a Zigbee transceiver; and
each second type wireless transceiver is a different wireless transceiver selected from the group consisting essentially of: a Bluetooth transceiver, a WiFi transceiver, personal area network transceiver, or a Zigbee transceiver.

* * * * *